United States Patent
Ankeny et al.

(10) Patent No.: US 6,467,994 B1
(45) Date of Patent: Oct. 22, 2002

(54) APPARATUS AND METHOD FOR BENEFICIAL USE OR HANDLING OF RUN-OFF OR COLLECTED WATER

(75) Inventors: Mark D. Ankeny, Albuquerque; James A. Kelsey, Corrales, both of NM (US)

(73) Assignee: Daniel B. Stephens & Associates, Inc., Albuquerque, NM (US)

( * ) Notice: Subject to any disclaimer, the term of this patent is extended or adjusted under 35 U.S.C. 154(b) by 0 days.

(21) Appl. No.: 09/574,293

(22) Filed: May 19, 2000

(51) Int. Cl.[7] .................................................. E02B 11/00
(52) U.S. Cl. .......................... 405/37; 405/40; 405/45; 405/52; 210/170; 210/747
(58) Field of Search .......................... 137/527.8, 132, 137/142; 210/170, 747; 405/36, 37, 39, 40, 41, 42, 43, 44, 45, 46, 47, 48, 49, 50, 51, 52, 53

(56) References Cited

U.S. PATENT DOCUMENTS

| | | |
|---|---|---|
| 862,276 A | 8/1907 | Newman |
| 903,395 A * | 11/1908 | Miller ........................ 137/132 |
| 2,033,306 A * | 3/1936 | Schofield ................. 137/527.8 |
| 2,362,747 A | 11/1944 | Duke |
| 3,159,172 A | 12/1964 | Baxter |
| 3,425,226 A * | 2/1969 | Santeford, Jr. ............... 405/44 |
| 3,791,443 A | 2/1974 | Burt |
| 4,020,902 A | 5/1977 | Valespino |
| 4,031,009 A * | 6/1977 | Hicks .......................... 405/36 |
| 4,171,921 A | 10/1979 | Morfeldt |
| 4,288,174 A | 9/1981 | Laws |
| 4,335,978 A | 6/1982 | Mutch |
| 4,362,434 A | 12/1982 | Valiga et al. |
| 4,430,021 A | 2/1984 | Wagner et al. |
| 4,483,641 A | 11/1984 | Stoll |
| 4,529,497 A | 7/1985 | Watson et al. |
| 4,538,386 A | 9/1985 | Di Cello |
| 4,543,016 A | 9/1985 | Tallard |
| 4,580,925 A | 4/1986 | Matich et al. |
| 4,618,284 A | 10/1986 | Marks |
| 4,678,369 A | 7/1987 | Gläser |
| 4,721,408 A | 1/1988 | Hewlett |
| 4,745,850 A | 5/1988 | Bastian et al. |
| 4,832,122 A | 5/1989 | Corey et al. |

(List continued on next page.)

Primary Examiner—Heather Shackelford
Assistant Examiner—Frederick L. Lagman
(74) Attorney, Agent, or Firm—McKee, Voorhees & Sease, P.L.C.

(57) ABSTRACT

An apparatus and method for the beneficial utilization or handling of run-off water. The apparatus includes a permeable underground water reservoir in combination with a siphon. Run-off water can be directed to the reservoir where its permeability allows infiltration of the water into an infiltration gallery which includes the soil around the system. Upon reaching a critical head, a siphon operates the siphon off water until the siphon is broken and infiltration resumes. The system can cycle between infiltration and siphon outflow unless an equilibrium between inflow and outflow is set up which can continue indefinitely. Alternative to a siphon, a valve could be used which allows outflow upon water in the reservoir reaching a critical head. The system could be used to clean or treat water, especially initial run-off from storms.

50 Claims, 7 Drawing Sheets

U.S. PATENT DOCUMENTS

| | | | |
|---|---|---|---|
| 4,908,129 A | | 3/1990 | Finsterwalder et al. |
| 4,919,568 A | * | 4/1990 | Hurley .................. 405/43 |
| 4,992,174 A | | 2/1991 | Caplan et al. |
| 5,080,782 A | | 1/1992 | Caplin et al. |
| 5,183,355 A | | 2/1993 | Treat et al. |
| 5,192,163 A | | 3/1993 | Fleming |
| 5,219,243 A | | 6/1993 | McCoy |
| 5,230,586 A | | 7/1993 | Bachhausen et al. |
| 5,259,697 A | | 11/1993 | Allen et al. |
| 5,322,387 A | * | 6/1994 | Heine et al. .................. 405/36 |
| 5,345,034 A | | 9/1994 | Corey |
| 5,374,138 A | | 12/1994 | Byles |
| 5,384,048 A | | 1/1995 | Hazen et al. |
| 5,405,225 A | | 4/1995 | Bilkenroth et al. |
| 5,421,672 A | | 6/1995 | Ankeny et al. |
| 5,435,666 A | | 7/1995 | Hassett et al. |
| 5,437,786 A | * | 8/1995 | Horsley et al. ............. 210/170 |
| 5,492,434 A | | 2/1996 | Adams et al. |
| 5,514,279 A | | 5/1996 | Blowes et al. |
| 5,522,672 A | * | 6/1996 | Moore .................. 405/41 |
| 5,702,593 A | * | 12/1997 | Horsley et al. ............. 210/170 |
| 5,823,711 A | | 10/1998 | Herd et al. |
| 5,829,191 A | | 11/1998 | Gatliff |
| 5,829,192 A | | 11/1998 | Gatliff |
| 5,836,115 A | | 11/1998 | Clay et al. |
| 6,277,274 B1 | * | 8/2001 | Coffman .................. 210/170 |
| 6,139,221 A1 | | 10/2001 | Ankeny et al. |

\* cited by examiner

Filling

APPARATUS AND METHOD FOR BENEFICIAL USE OR HANDLING OF RUN-OFF OR COLLECTED WATER

BACKGROUND OF THE INVENTION

1. Field of the Invention

The present invention relates to long-term underground water recharge, and in particular, to the use of storm and other run-off water, or water that has been collected, to cause such recharge and produce additional benefits therefrom.

2. Problems in the Art

Soil functions as a plant growth medium, a regulator and partitioner of water flow, and as a buffer of environmental change. A National Research Council report reviews soil's role in the hydrologic cycle (National Research Council. 1993. Soil and Water Quality: An Agenda for Agriculture. National Academy Press. Washington, D.C.). Rainfall in terrestrial ecosystems falls on the soil surface where it either infiltrates the soil or moves across the soil surface into streams or lakes. The condition of the soil surface determines whether rainfall infiltrates or runs off. If it infiltrates the soil, it may be stored and later taken up by plants, move into ground waters, or move laterally through the earth, appearing later in springs or seeps. This partitioning of rainfall between infiltration and run-off determines whether a storm results in a replenishing rain or a damaging flood. The movement of water through soils to streams, lakes, and ground water is an essential component of recharge and base flow in the hydrological cycle (Stephens, D.B. 1995. Vadose Zone Hydrology. Lewis Publications, Boca Raton, Fla. 347 pp.).

Current engineering practices in the Southwest United States and other places often reduce infiltration and increase run-off by collecting and conveying storm water quickly and efficiently for ultimate discharge to an existing surface water course. The goals of this management strategy are to reduce hazards to the public and minimize property damage. Although this strategy maximizes the objectives in terms of safety and risk reduction, it prevents the beneficial use of storm waters through recharge. Conveyance times are minimized while flow rates are maximized to remove it from highways, streets and public areas. With concern growing over the availability of water supplies for public and industrial use, alternative uses of storm water must be considered, and if practical, implemented.

Root systems can increase soil saturated hydraulic conductivity over an order of magnitude (Prieksat, M. A., T. C. Kaspar, and M. D. Ankeny. 1994. Positional and temporal changes in ponded infiltration in a corn field. Soil Sci. Soc. Am. J. 58:181 –184). Increased root biomass results in more root channels as well as an associated increase in faunal activity creating wormholes and other channels. These preferential flow paths increase saturated hydraulic conductivity. In arid and semi-arid systems, plant growth is usually limited by water availability. Because plants maintain fairly constant root:shoot ratios, root mass and soil hydraulic conductivity are often directly correlated with water availability.

Therefore, current practices might produce beneficial results in one sense, namely the more efficient removal of run-off water, and in another sense it can be detrimental.

Most previous buffer zone and riparian zone research (primarily from the Northeast and the Midwest) has operated on the premise that vegetation is necessary to establish control to run-off. In the western United States (U.S.), establishment of vegetation is often problematic due to intermittent water supply. Thus, contrary to what is typically found in the eastern U.S., run-off must be controlled to (re)establish vegetation in arid and semi-arid areas. Run-off control can provide water for establishment of vegetation. One problem is obvious: to obtain the benefits of vegetated buffer zones in arid and semi-arid areas, we need effective methods to convert transient run-off into a steady water source for establishment of vegetation.

Healthy riparian areas provide numerous benefits when viewed as a component of the basic hydrologic unit, i.e., the watershed. Woody riparian species provide channel and bank stability and thus prevent incisement of the channel. Local ground-water levels are maintained due to slow release of bank storage. Natural fluvial processes create channels which efficiently transport water. Water quality is improved where sources of sediment from destabilized banks are eliminated. Shading reduces extreme fluctuations in temperature and evaporative losses from perennial streams. Additionally, riparian zones can attenuate high flood flows while promoting sediment deposition and ground water recharge. These attributes optimize the hydrologic response of a watershed with regards to the storage and discharge of water.

From a soil science perspective, grazing and cropping practices have often reduced soil water storage capacity and increased run-off. A common result has been lowering of local water tables with permanent stream reaches becoming intermittent. From a hydrological perspective (e.g., Menzel, B.W. 1983. Agricultural management practices and the integrity of instream biological habitat. pp. 305–329, in Agricultural Management and Water Quality, F. W. Schaller and G.W. Bailey, eds. Iowa State University Press. Ames, Iowa), these same agricultural practices lead to an exaggerated seasonal flow regime and increase the frequency, severity, and unpredictability of high-volume flows.

Subsurface flow, including that from recharge galleries, generally provides a more constant source of water than surface flow. Obligate phreatophytes, such as cottonwoods, require a constant source of water for survival. Facultative phreatophytes, such as salt cedar (Tamarix sp.), tolerate drier periods. In southwestern riparian zone forests (bosques), replacement of native vegetation (such as willow and cottonwood) by exotics (such as salt cedar and Russian olive) has occurred with watershed degradation over time. The recharge component of the water balance considered critical for maintaining base flow in streams is therefore important in maintaining desired vegetation.

Surface water have been diverted and infiltrated for thousands of years in various parts of the world (Bruins, J. J., M. Evenari, and U. Nessler. 1986. Rainwater-harvesting agriculture for food production in arid zones: the challenge of the African famine. Appl. Geography. 6:13–32). Wills (1988) summarizes much of the literature on prehistoric southwestern U.S. agriculture and water harvesting (Wills, W. H. 1988. Early prehistoric agriculture in the American southwest. 188 pp. School of American Research Press, Santa Fe, N.Mex.). The primary objective of water harvesting is short-term water storage in the soil profile for crop growth. In the southwest, Native American farmers place fields to optimize water and sediment trapping These relationships among soil, vegetation, and erosion/deposition are discussed by Jenny (Jenny, H. 1980. The Soil Resource. Springer-Verlag, New York). Soils derived from aeolian deposits, alluvium and colluvium are generally considered unsuitable for agriculture because of their high infiltration rates (Tabor, J. A. 1995. Improving crop yields in the Sahel by means of water-harvesting. J. of Arid Environments. 30:83–106).

While water erosion processes are complex, as evidenced by an abundant and growing amount of technical literature, the principals of erosion control are often stated as these relatively simple principles. Plant, plant residue, or mulch cover should be increased in intensity or in time to decrease energy and volume of run-off water. In the west, local increase of recharge also may facilitate erosion control. The rationale is this: Increased recharge results in increased bank vegetation, and increased bank vegetation reduces bank erosion. Bank erosion is a major contributor to the sediment load in many western streams.

Therefore, the potential benefit can be seen in the encouragement of vegetation growth, not only for reducing possible erosion, and not only for the increased ability for long-term recharge of underground infiltration galleries, but vegetation can actually increase the holding potential of water underneath the ground and beneficially improve hydrological characteristics of the soil.

Additionally, there is a significant amount of attention on water treatment of run-off water, including by the Environmental Protection Agency (EPA). A substantial number and amount of pollutants can exist in run-off, particularly the first stages of run-off. In the southwest, for example, such things as grease, oil, gasoline, dog waste, and even viruses, can accumulate above ground during dry times. Initial run-off would produce water that is full of such things. If allowed its normal course, the run-off, as explained above, would be collected in storm sewers. It many times would be transported and released in a manner that would allow it to reach ground water, where it could pollute the same. A real need exists for a way to treat such run-off, especially the first run-off, before it reaches ground water.

Still further, there could be advantages to be able to take water which has been previously been collected, for example in a reservoir, and move such water to another location. Water from a reservoir could be used to charge areas downstream of the reservoir.

The primary methods for artificial recharge include: (1) water spreading, (2) infiltration basins, (3) injection wells, and (4) infiltration galleries. Each of these is described briefly below, along with their advantages and disadvantages.

Water spreading simply spreads water upon an existing or graded landform. Water spreading is often used on river beds and has been used in rangeland management. Infrastructure and maintenance costs are low. Because water is infiltrating under approximately unit gradient conditions, infiltration on an areal basis is often low which, in turn, leads to large shallow infiltration areas prone to high evaporation and reduced water quality. Playas constitute a natural example of this hydrological behavior.

Infiltration basins are ponds constructed to maximize the infiltration of water into the underlying soil. Often, infiltration is impeded because the basin bottom tends to clog rapidly with fine sediments, creating a low-permeability (clogging) layer that severely impedes downward flow of water. By allowing the pond to dry out completely between periods of infiltration, higher infiltration rates are achieved. However, intermittent cleaning of the pond bottom is usually required. Graded fill material may be used in the pond bottom to create a filter for fine sediment.

Injection wells are similar to ground-water extraction wells, except that water flows into the well instead of out. In contrast to ponds, galleries, or dry wells, there is no opportunity for removal of suspended solids or dissolved solutes within the vadose (unsaturated) zone because injection wells recharge the aquifer directly within the saturated zone. Therefore, injection wells must use water of higher quality than for the other methods.

Because of the relatively small surface area of a wellbore, as compared for example with infiltration galleries, gradual clogging of injection wells is to be expected without expensive particulate removal.

Clogging is caused by both corrosion of well screens and plugging of the borehole wall by fine sediment. For this reason, regular redevelopment of injection wells is often necessary and accounts for much of the operating expense for this type of system.

Advantages of injection wells include: (1) large infiltration capacity, (2) availability of land surface for other beneficial uses. Disadvantages include: (1) high initial construction costs, (2) potentially high permitting costs, (3) high maintenance costs for well re-development, (4) requirement that feed water be of high quality to avoid aquifer contamination.

Infiltration galleries consist of a network of subsurface pipes set in gravel-filled trenches. The size of the trenches and piping system are dependent on the rate at which water is to be introduced into the subsurface. The permeability of the soil must first be tested using field and/or laboratory methods. Once this is known, mathematical equations exist to determine the trench size and geometry to guarantee adequate infiltration capacity for the planned flow rate. Over design of the infiltration galleries is standard procedure to allow for some clogging of the trench walls over time. Infiltration galleries for artificial recharge have received little attention in the western US.

Where relatively coarse soils are present at the ground surface, infiltration galleries can be among the most efficient means of artificial recharge. Advantages of infiltration galleries include: (1) large infiltration capacity, (2) large subsurface storage volume, (3) longer vadose zone residence time for improved water quality, (4) availability of land surface for other beneficial uses (e.g. forage), and (5) possible conjunctive use as a subsurface irrigation system for plant cover. The main potential disadvantage in this setting is the potential for clogging when using sediment laden waters.

It can therefore be seen that there is a real need in the art, especially in more arid regions, for a system to beneficially utilize or handle storm and other run-off water, in particular, for recharging and storing water underneath the ground, or treating the same. It is therefore a principal object of the present invention to provide an apparatus and method for the beneficial use or handling of run-off water. Other objects, features, and advantages of the invention include an apparatus and method for beneficial use or handling of run-off water which:

1. Is passive.
2. Is low maintenance.
3. Is low cost.
4. Enhances long-term water recharge capabilities of underground infiltration galleries.
5. Encourages vegetation growth and root development.
6. Improves soil conductivity and hydrological characteristics of soil.
7. Reduces or controls erosion.
8. Is durable.

9. Can be used to at least partially treat water.

10. Decreases energy and volume of run-off water.

11. Can be self cleaning.

12. Decreases sediment load in streams.

Another object is to assist in moving previously stored water to recharge underground infiltration galleries. Desirable effects are achieved by cycling 'dirty' water in an infiltration gallery: i.e., backflushing, maintenance of high permeabilities, and sediment removal.

These and other objects, features, and advantages of the present invention will be become more apparent with reference to the accompanying specification and claims.

SUMMARY OF THE INVENTION

An apparatus and method is presented for the beneficial use or handling of run-off or previously collected water. The apparatus includes a siphon or other draining device in combination with a permeable underground water reservoir. A source of run-off or previously collected water is in fluid communication with the permeable water reservoir. The run-off or collected water fills up the permeable water reservoir and infiltrates the ground around the reservoir until it reaches the level that equals the critical head of the siphon or draining device. At that time, the siphon or draining device drains water from the reservoir to an outlet. The outlet essentially takes overflow water to a desired location.

The method directs run-off or previously collected water to an intentionally permeable underground water reservoir. Inflow of run-off or collected water is allowed to go into the reservoir and further infiltrate surrounding soil for recharge of the soil with water or treatment of the water. Inflow continues to cause infiltration of the surrounding soil until inflow causes the level of the reservoir to rise above a critical head. At that time, water is removed from the reservoir. As long as inflow generally equals outflow, an equilibrium will exist. When inflow plus infiltration is less than outflow, the reservoir will be drained down until a predetermined point. At that time, the system is ready for additional inflow and infiltration.

DETAILED DESCRIPTION OF THE PREFERRED EMBODIMENT

Overview

In order to better understand the invention, a preferred embodiment will now be described in detail. Reference will be taken from time to time to the drawings. Reference numerals will be used to indicate certain parts and locations in the drawings. The same reference numerals will be used to indicate the same parts and locations throughout the drawings unless otherwise indicated.

Environment

The context of the preferred embodiment will be described with respect to an underground infiltration gallery in a semi-arid or arid location. It is to be understood that the invention can work in other situations and contexts.

Apparatus

Figure 1:
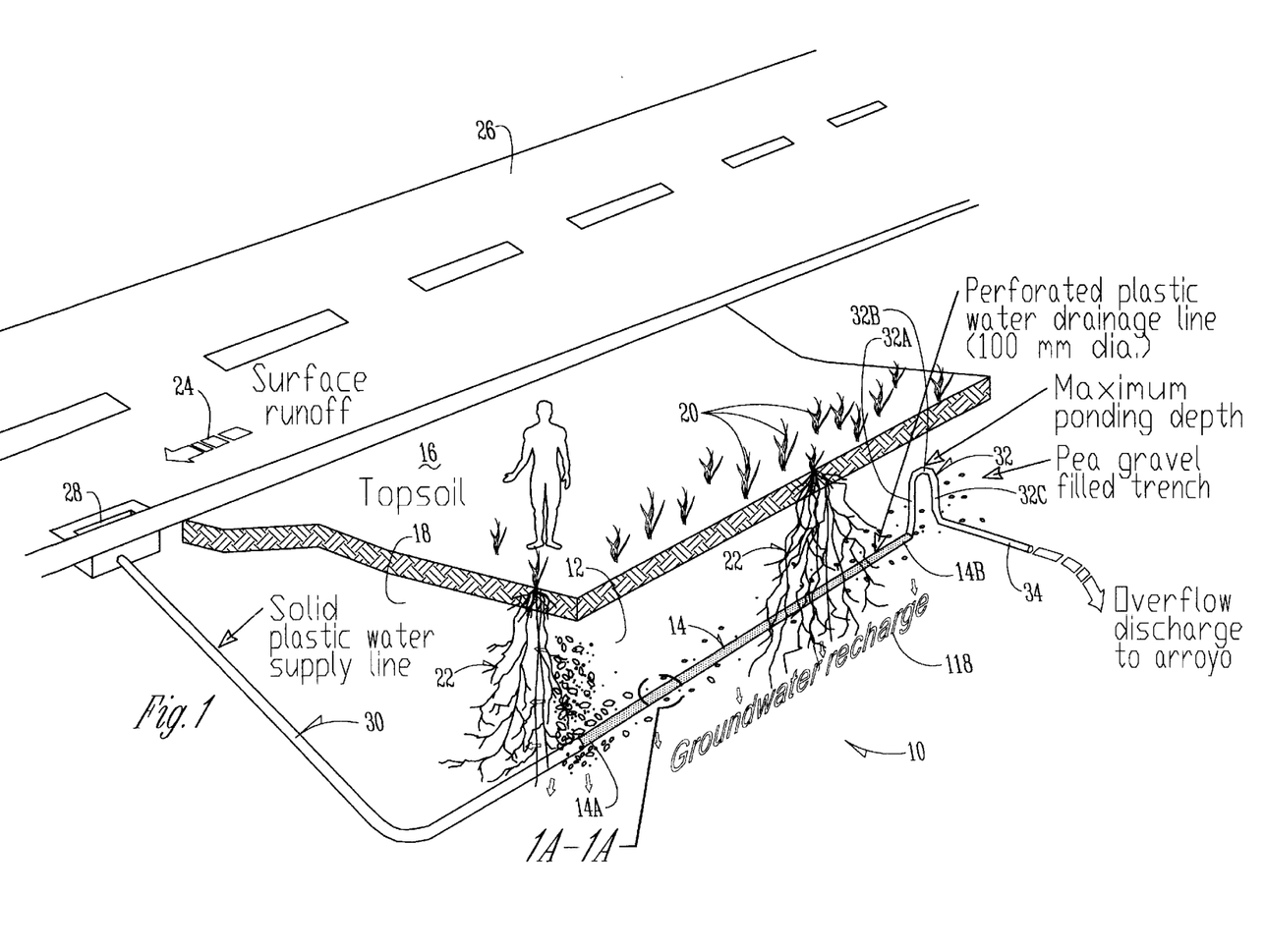
FIG. 1 is a diagrammatic view of a preferred embodiment of the invention in place in the ground.

FIG. 1 diagrammatically depicts a system (designated generally at 10) according to a preferred embodiment of the invention. System 10 includes a pea-gravel filled trench 12 which is permeable to water. A perforated plastic water drainage line (100 mm diameter) is positioned along trench 12. The drainage line is designated generally at reference numeral 14. Drainage line 14 is sloped slightly downwardly from the left side of FIG. 1 to the right side, or stated differently, from an inlet end 14A to an outlet end 14B.

Figure 1A:
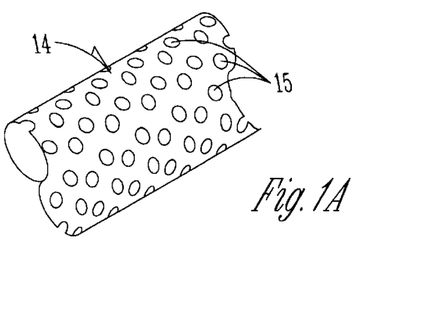
FIG. 1A is an enlarged perspective view of an embodiment of a portion of the drainage pipe of FIG. 1 taken at line 1A—1A.
Figure 1B:
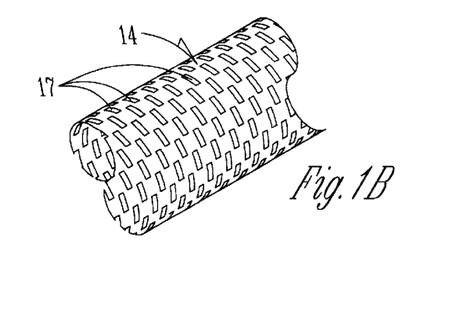
FIG. 1B is an alternative embodiment of the pipe of FIG. 1A.

Drainage line 14 can be perforated, such as holes 15 (see FIG. 1A), or slits 17 (see FIG. 1B) along its length. The area of the perforations is such that relative to the diameter of line 14, the impedance to infiltration is primarily in the soil and not in the perforations.

FIG. 1 shows top soil 16 over trench 12 and surrounding ground soil 18. Vegetation 20 and root systems 22 are illustrated for some of the vegetation 20 of FIG. 1. Surface run-off water 24 is diagrammatically illustrated coming off of surface 26 into storm sewer drain 28. An impervious plastic water supply line 30 is connected between storm sewer drain 28 and the inlet end 14A of drainage line 14 to deliver surface run-off water to drainage line 14 in trench 12.

A structure which can function as a siphon is connected to discharge end 14B of drainage line 14. In the preferred embodiment, what will be called the siphon section 32 includes an upper extending leg 32A, an downward extending leg 32C, and a curved intermediate portion 32B. Cumulatively siphon section 32 is an inverted "U". A conduit 34 is attached to leg 32C of siphon section 32 and can be directed to any desired location. As shown in FIG. 1 it could be to an arroyo and function as an overflow discharge.

System 10 therefore consists of a permeable water reservoir under the ground. This reservoir includes trench 12, which is porous and highly conductive of water, as well as the surrounding soil, having a porosity and fluid conductivity. Together this alternatively could be termed an infiltration gallery that can receive and store water. System 10 also includes an inlet or inflow source for surface run-off, here comprising the storm sewer drain 28 and supply line 30. System 10 further comprises the perforated drainage line 14 as a mechanism to both deliver water to trench 12, and in certain circumstances, receive water from trench 12. Finally, system 10 includes the siphon 32 that is down-stream from drainage line 14 and trench 12.

Operation

The operational objective is to maximize long-term water recharge in an infiltration gallery while minimizing long term maintenance requirements. The objectives of the analysis for this structure is multi-fold and includes: (1) determination of hydraulic parameters, as discussed in more detail below, governing system operation, (2) quantification of water velocities within the system needed to entrain sediment carried into the system, and (3) quantification of the recharge potential of the system through various storm events.

Physical Design

Figure 2A:
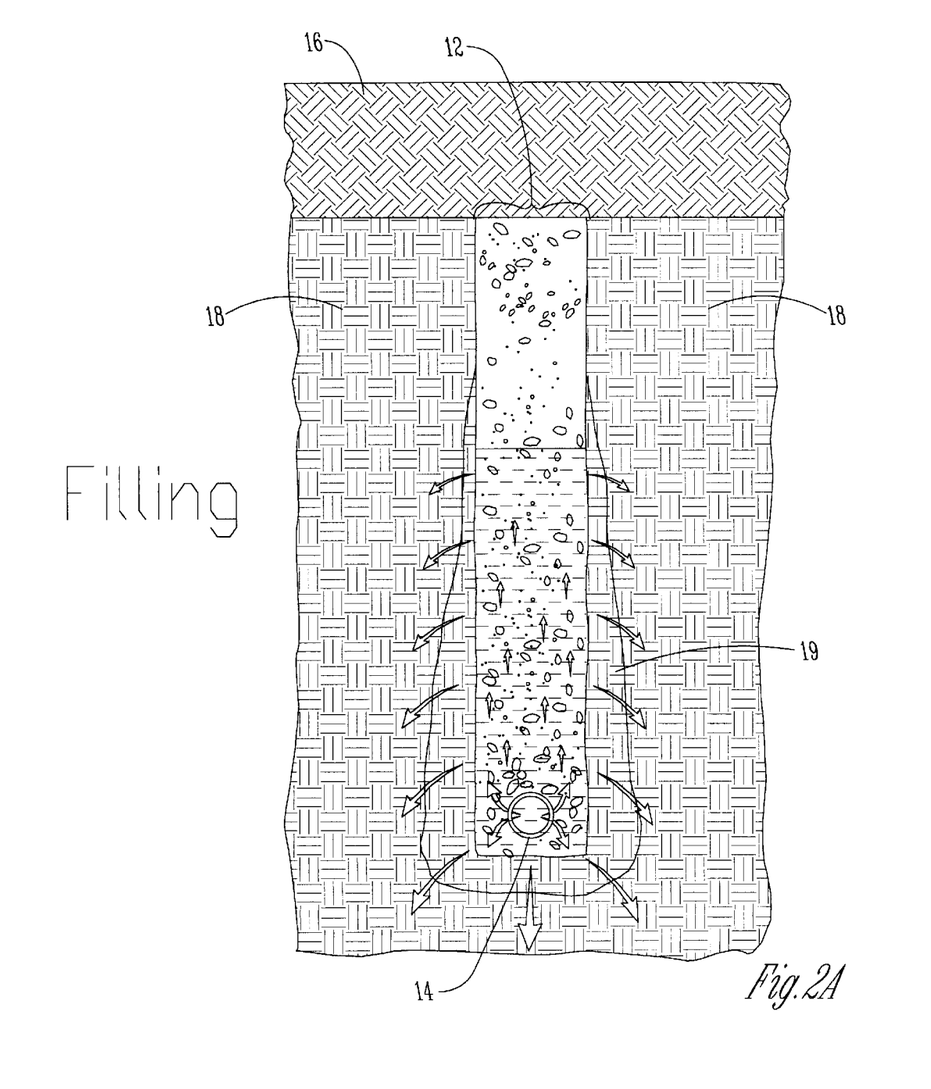
FIG. 2A is a diagrammatic enlarged cross-section of FIG. 1 illustrating a filling or infiltrating flow regime according to a preferred embodiment of the invention.
Figure 2B:
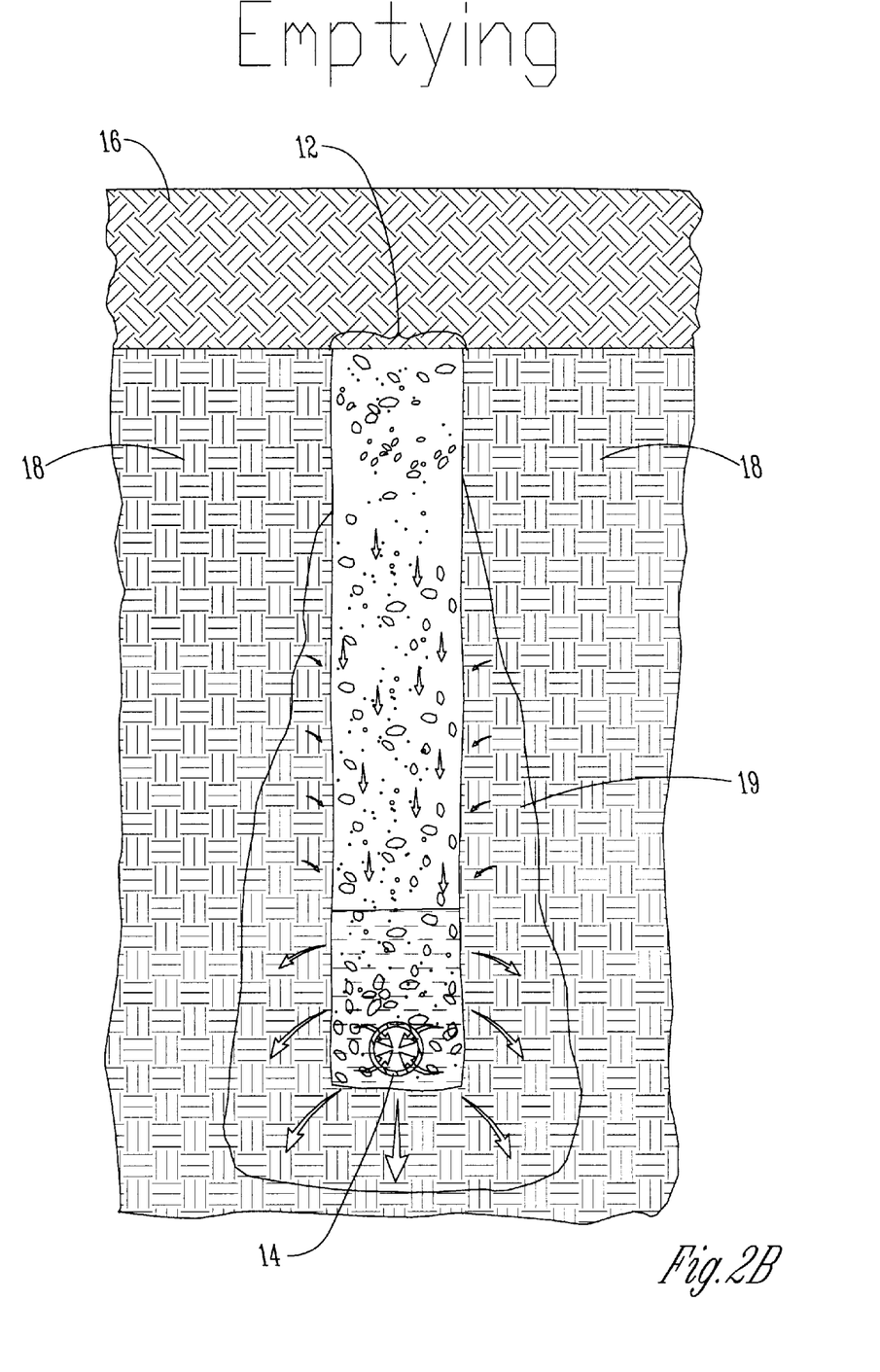
FIG. 2B is similar to FIG. 2A but shows an emptying or cycling outflow regime according to the embodiment of FIG. 1.

The system is diagrammatically illustrated in FIG. 1. The siphon behaves as a standard siphon and cycles (drains) as the water level exceeds the critical head in siphon 32. After the drainage cycle, the siphon breaks and the siphon reservoir (12/14/18) refills. The siphon reservoir consists of the drainage pipe 14, the large air-filled pores in the gravel backfill 12, and the air-filled pore space in the surrounding soil 18 (FIG. 2). The area immediately surrounding gravel trench 12 (indicated by line 19) is a wetted soil zone or partially saturated soil. As the siphon reservoir 12/14/18 refills, water infiltrates into and is redistributed by the soil 18.

As discussed, the system consists-of perforated pipe 14 buried in a gravel-filled trench (FIG. 2). Perforated pipe 14 is bedded at a nominal slope toward the discharge with an ascending limb 32A angled upward at the terminal end. This upward angled non-perforated portion 32A is formed into a radius 32B of approximately 180° forming an inverted P-trap. This radius is directed downward for discharge. The system operates passively by capturing a point source flow such as a storm drain inlet or other concentrated flow source.

When siphon 32 cycles, water velocity in drainage pipe 14 increases, silt in the overlying gravel 12 is back flushed, and water in drainage pipe 14 reaches entrainment velocity for silt and clay deposited during the infiltration phase of the cycle. Thus, the siphon can take a linear input of water, sediment, and potential energy and turn it into a nonlinear system that retains a large fraction of the water and potential energy while discharging the sediment and part of the water.

Water Flow

TOUGH-2, a multiphase, multidimensional flow and transport code (Pruess, 1991. TOUGH-2: A general purpose numerical simulator for multiphase fluid and heat flow. LBL-29400, Lawrence Berkeley Laboratory, Berkeley, Calif.) was used to model trench infiltration across a range of soil types and hydraulic heads. Output from this model was used as input for a spreadsheet application to model the infiltration gallery/siphon system 10.

The equation governing siphon operation is the energy equation developed by Bernoulli:

$$\frac{P_i}{\gamma} + \frac{V_i^2}{2g} + Z_i = \frac{P_o}{\gamma} + \frac{V_o^2}{2g} + Z_o + h_f$$

where Z=elevation of the pipe (m), P is pressure (N/m²), γ is fluid density (kg/m³), V is fluid velocity (m/sec), g is the gravitational constant (m/sec²), and $h_f$ is the head loss within the system (m). Head loss is system dependent and includes friction losses and pipe bends. The subscripts "i" and "o" refer to inlet and outlet values, respectively. This governing equation is used to calculate flow within the spreadsheet model.

In addition to standard hydrologic modeling, the siphon is governed by logical statements embedded within the spreadsheet code to start and stop the siphon based upon water level in the system and upon the previous status of the siphon.

Figure 3A:
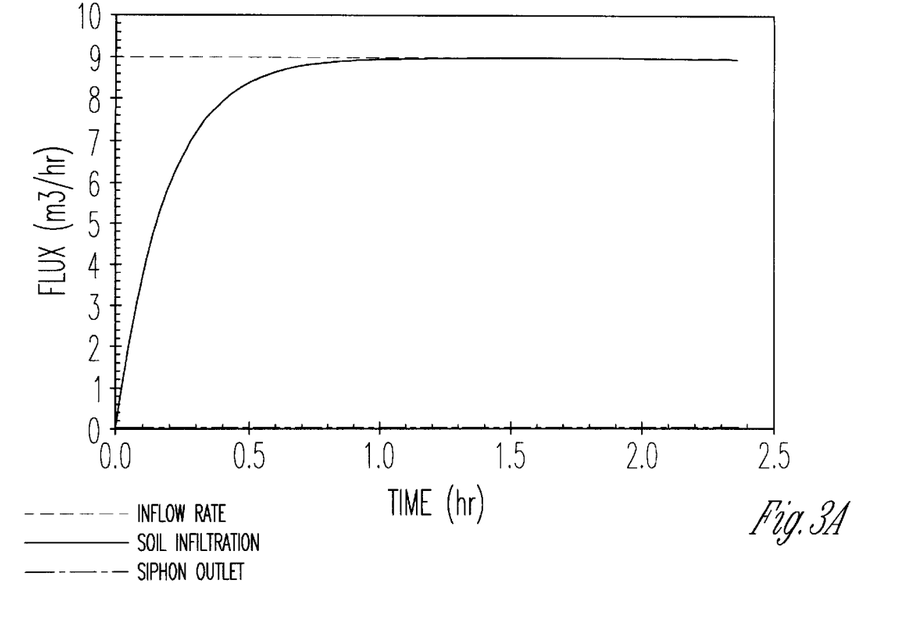
FIG. 3A is a graph of infiltrating inflow regime as shown in FIG. 2A.
Figure 3B:
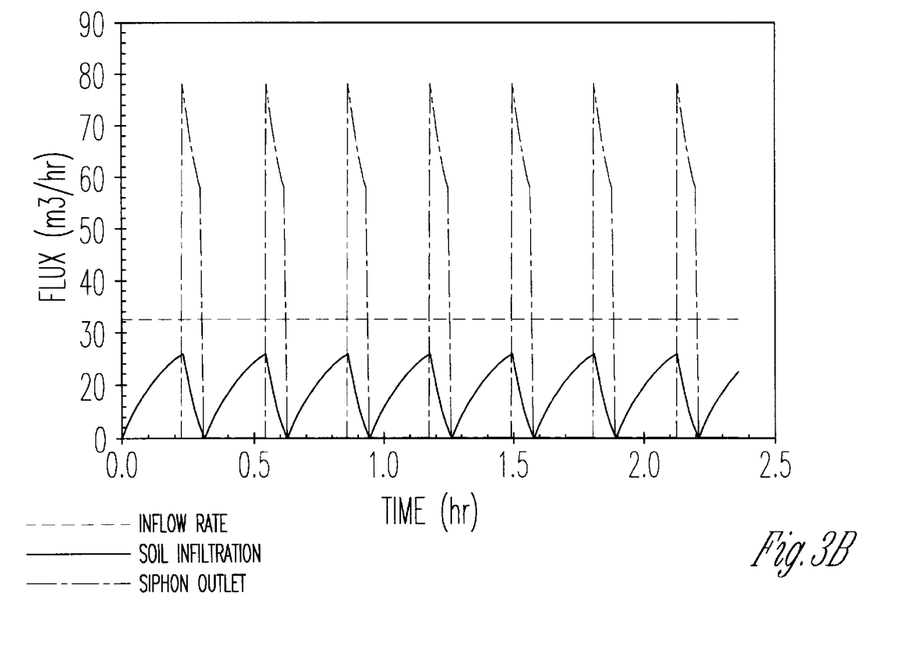
FIG. 3B is a graph similar to FIG. 3A showing cycling between infiltrating inflow and outflow of the system of FIG. 1.
Figure 3C:
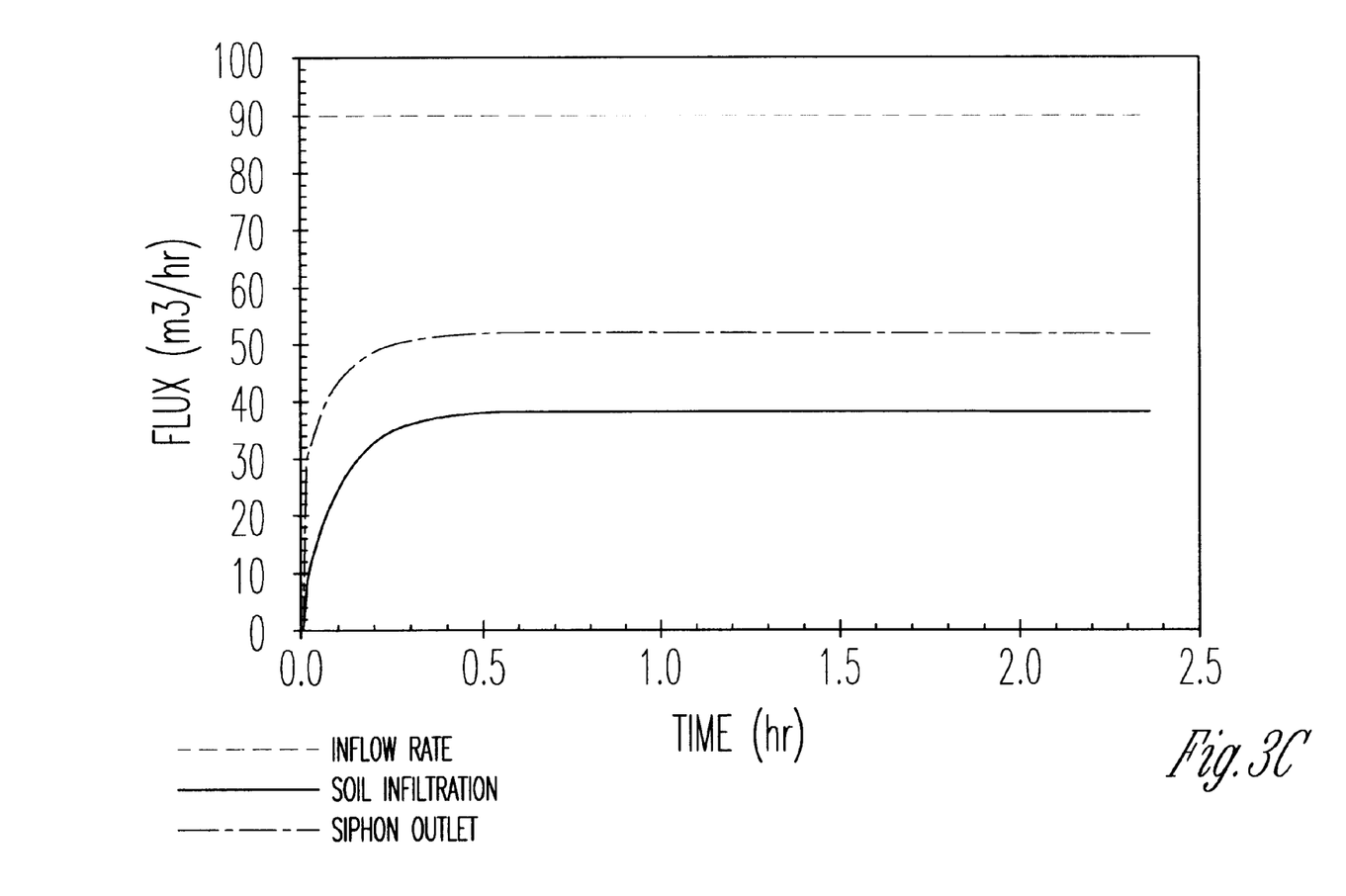
FIG. 3C is a graph of continuous outflow of the system of FIG. 1.

Three flow regimes exist for an infiltrating siphon system: (1) infiltrating inflow, (2) cycling outflow, and (3) continuous outflow. FIGS. 3A–C show siphon behavior under the three flow regimes.

The results shown in FIGS. 3A–C are for a 50 meter long by 0.2 meter wide by 1.75 meter deep soil trench 12 backfilled with coarse gravel placed over a 0.10 meter diameter perforated pipe 14. Porosity of the gravel is 35%. Siphon 32 empties into an arroyo 1.5 meters below the bottom of trench 12. The soil used for calculations is a loamy sand with a permeability of $4.1*10^{-5}$ m/s. The rational method (run-off=CIA, where I=rainfall intensity, A=area involved, and C=run-off coefficient) is used to estimate run-off and a run-off coefficient of 0.90 is used (which approximates run-off from land and paved streets into a storm sewer). Rainfall intensity is varied from a drizzle (1 mm/hr) in FIG. 3A to a light rain (5 mm/hr) in FIG. 3B and to a downpour (50 mm/hr) in FIG. 3C. Each rainfall intensity results in a different flow regime. The rational method of runoff calculation is simply:

$$Q = CIA$$

where Q is the flux in m3/s, C is the runoff coefficient (the fraction that does not soak into the surface) and is unitless, I is the rainfall intensity in m/s, and A is the area from which rainfall is being collected in m².

The equation for water flow in the infiltration gallery when the siphon or flow is activated is:

$$Q = Cd*SQRT(2*g*Head)*pi*Rpipe^2$$

where Q is flux through the pipe in m³/s, Cd is a pipe specific flow coefficient, g is gravity in m²/s, Head is water level or head in the pipe in m, and Rpipe is pipe radius in m.

In infiltrating inflow (FIG. 3A) infiltration into the trench 12 bottom and walls exceeds inflow. All water infiltrates and trench water level is less than the water level needed to activate siphon 32 (critical head).

In cycling outflow (FIG. 3B), when inflow exceeds trench infiltration capacity, the water head in trench 12 exceeds the critical head, and siphon 32 is activated. For flow to stop, the rate of outflow must exceed the sum of inflow and infiltration up until the point at which trench 12 is emptied of water. At this point, air entering pipe 14 through inlet 28 or through the perforations is able to break the water column and stop siphon 32.

In continuous outflow, an equilibrium is reached between inflow and outflow (FIG. 3C). Water level in trench.12 and infiltration from trench 12 is constant.

Figure 4:
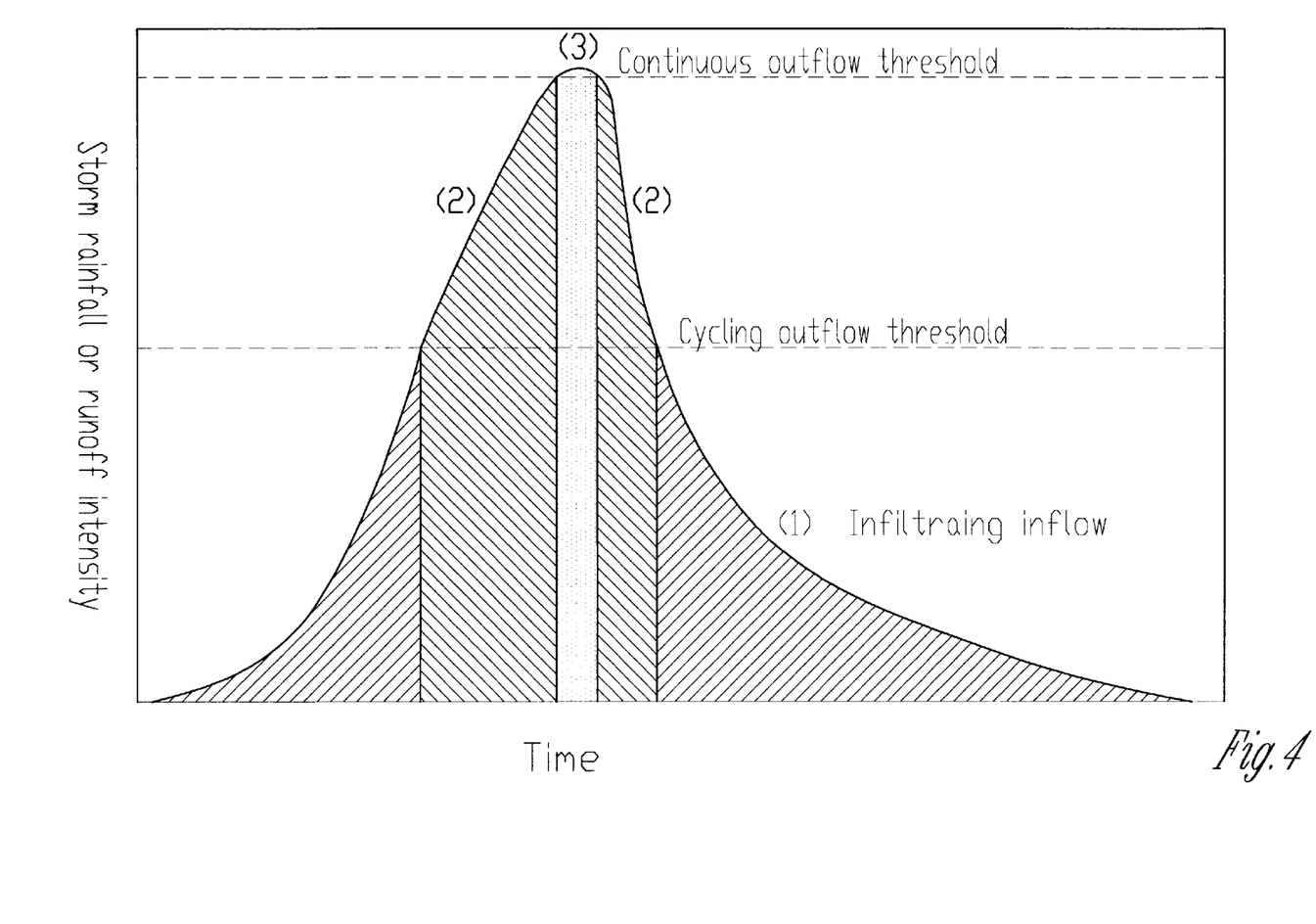
FIG. 4 is a graph illustrating changes in siphon system behavior over the course of a rain storm.

All of these flow regimes potentially can be seen in a single rainfall event. FIG. 4 schematically shows rainfall intensity over the course of a typical southwestern thunderstorm. Rainfall starts, quickly builds to maximum intensity, and then slowly tails off. Run-off and erosion intensity follow a similar qualitative pattern. At low rainfall intensities with low sediment inputs, all water infiltrates (regime 1). As the rainfall intensity increases, sediment input increases, the cycling threshold is reached, and the system starts to cycle (regime 2). If rainfall intensity increases sufficiently, sediment concentrations may increase, and a continuous outflow flow regime can be established (regime 3). As rainfall decreases, the system will then revert to cycling outflow, and finally, to infiltrating inflow regimes.

Sediment

Sediment accumulation varies with flow regime. Under infiltrating flow, all water infiltrates and sediment accumulates in the system. However, because infiltrating flow generally occurs during low rainfall intensity events, little sediment enters the system.

During cycling flow, sediment accumulates during the infiltration phase of the cycle and is flushed during the siphon phase. Design parameters must be set to ensure an adequate velocity to entrain sediment in perforated pipe 14 and to back flush the overlying gravel backfill 12. The water velocity obtainable in the system defines the particle size that can be entrained and removed. This velocity sets the upper limit on particle size that can be accommodated by the system.

During constant outflow, little sediment is likely to accumulate in pipe 14. However, sustained unidirectional flow into soil is likely to result in some soil plugging and permeability decline. The time frame is likely to be empirically dependent upon soil properties, sediment flux, and particle size distribution.

Dosing siphons are used to dose or pulse a septic leach field. These siphons are connected to an impermeable liquid-storing chamber and release water/sewage through the siphon to an infiltration or leach field. The pulsing serves to more effectively distribute fluid over the length of the infiltration. Sediment can accumulate in the infiltration field or in the chamber. Thus, many of these systems are designed with cleanouts. These systems are described in some municipal codes and can be found on the web.

The present siphon system has the following unique aspects:

(1) The chamber from which siphoning occurs is permeable. Infiltration of water into soil occurs upstream of the siphon instead of downstream from the siphon. In contrast, dosing siphon systems are not connected to a permeable water reservoir or infiltration gallery. (2) Because the water reservoir/infiltration gallery is permeable, the height of the siphon inlet and outlet can be selected to vary the partitioning of water and water solutes between infiltration and siphon outflow. Varying the partitioning allows the user to optimize the system for water recharge, contaminant trapping, or sediment flushing. (3) Because the siphon is downstream of the infiltration gallery, sediment can be remobilized and purged from the system when the siphon cycles. In contrast to other systems, outflow velocities are designed to entrain sediment. Thus, sediment does not accumulate anywhere in the system, i.e.; the system is self-cleaning because of siphon positioning and design. Cleanouts and cleanout costs can be reduced or avoided.

(4) The siphon system can be deliberately designed to operate under both siphoning and nonsiphoning flow regimes. This, for example, is likely to occur during a single rainfall event as rainfall intensity builds, peaks, and falls. Because sediment loading typically increases with rainfall and runoff rates, this design allows for both high linfiltration efficiency of water and contaminants at low flow rates and effective sediment removal at high flow rates.

Vegetation/Siphon System Interactions

Thus, a potential positive feedback loop exists where increased water availability from the siphon system increases plant and root mass which increases soil hydraulic conductivity which, in turn, increases water recharge and water availability.

These soil-plant-water relationships can be exploited in a siphon system. By increasing water availability, both root growth and hydraulic conductivity of the infiltration system can improve over time. This is particularly true of finer-textured semi-arid and arid soils where little macroporosity exists. Addition of plant roots and water leads to new macropore channels. The reduced carbon released by these roots ultimately results in soil aggregation. These soil aggregation processes are driven by reduced carbon from plants and can be used to combat the natural tendency of pressurized particulate-containing water to plug infiltration systems.

Options, Features and Alternatives

The preferred embodiment of the invention is given by way of example only and not by way of limitation to the invention which is solely described by the claims herein. Variations obvious to those skilled in the art are included within the invention.

For example, other inlet sources for water to be used with system 10 could be used. Any point source of water may be used. This water can be water directed (e.g. piped in) from previously collected or stored water (e.g. tanks, reservoirs, lakes, etc.).

Supply line 30 and the material for siphon 32 and outlet 34 can vary. Their size can also vary with application. Permeable section or water drainage line 14 can also vary in construction. In the preferred embodiment, supply line 30, drainage line 14, siphon 32 and outlet 34 are made of plastic pipe. For example, drainage line 14 can be conventional corrugated, perforated polyethylene drainage line.

The size and configuration of trench 12 can vary, as can the backfill. Fairly high hydraulic conductivity is desired.

Siphon 32 can take various forms and configurations. The height of siphon 32 determines the critical head for the siphon. Other ways of siphoning materials in determining critical head are possible.

The discharge end 34 could be terminated in the ground or channeled to some other location above ground or in ground. One example is discharging to an arroyo or other existing water way.

It is to be understood that the dimensions, including the length of trench 12, length of drainage line 14, and indeed the configuration of the same, could vary according to need and application.

Figures 5A, 5B:
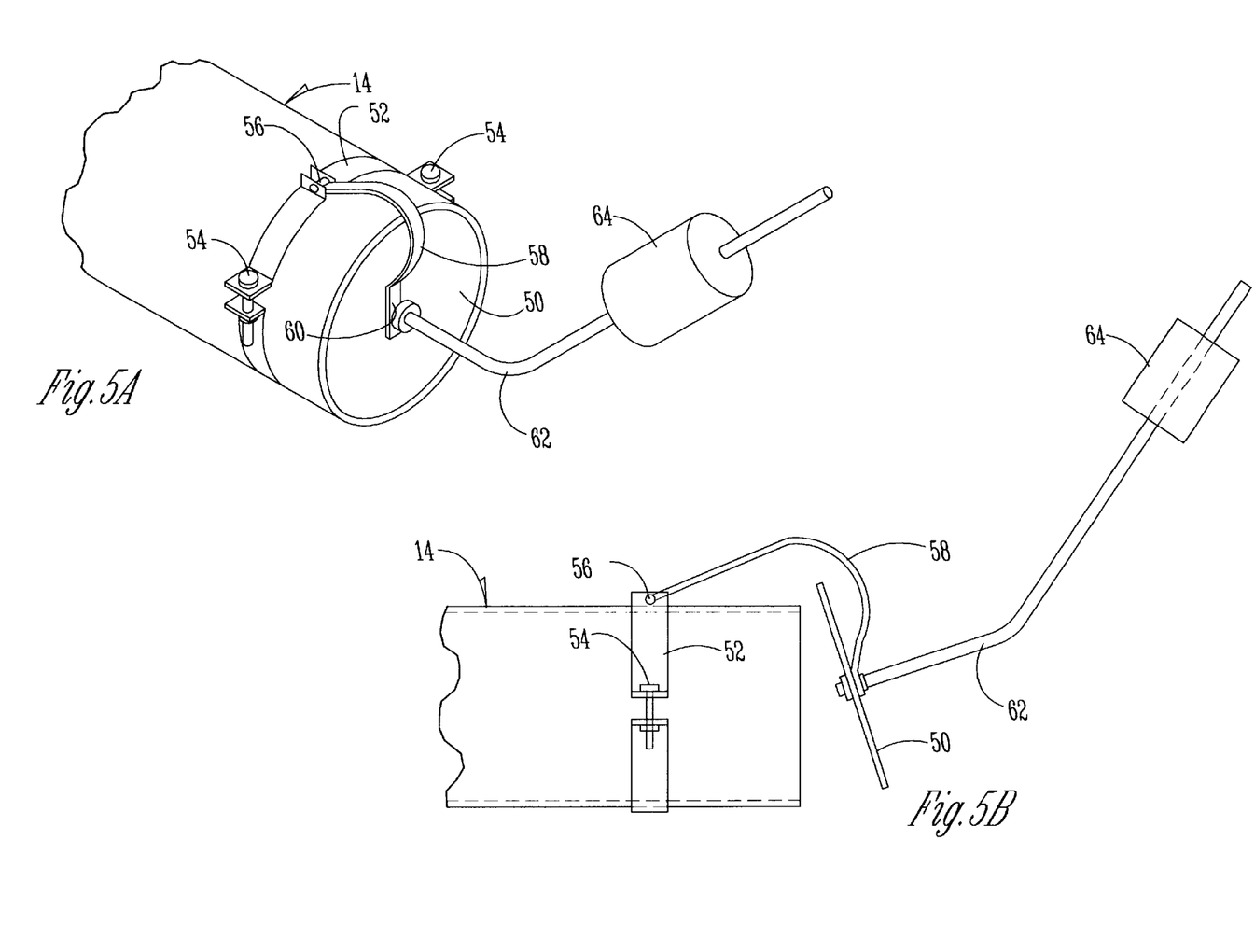
FIGS. 5A and 5B are enlarged depictions of an alternative to a siphon for controlling movement of water out of the drainage line of FIG. 1.

The effects of the siphon system (cycling) can also be achieved with the use of a valve or flap gate at the terminus of the infiltration gallery. The terminal valve can be spring-loaded to open and close at desired water heads or automated with water level monitoring equipment and an electronic valve to attain the same effects. Another alternative to the siphon arrangement discussed above would be a trap-door or valve arrangement shown in simplified form in FIGS. 5A–5B. A door or valve element 50 could move between a closed position (see FIG. 5A) blocking outflow from drainage line 14 and an open position allowing outflow (see FIG. 5B). A weight 64 could be appropriately placed to urge the door to the closed position. The weight mass and position (via angled rod 62) could be selected and adjusted to hold door 50 in the closed position. until a certain pressure head in drainage pipe 14 is reached, at which time it would open and allow outflow. The weight 64 and 62 would also have characteristics that would move the door 50 to the closed position once pressure drops below a certain threshold to allow cycling of the system, like the siphon. Door 50 could be pivotally connected to pivot 56 by connector 58/60. Pivot 56 could be positioned on pipe 14 by clamp 52/54.

Another environment for the invention could be the treatment of run-off. As discussed above, run-off water may contain problematic substances such as animal waste, petroleum products, or viruses and bacteria. Instead of simply using run-off to store water, the invention could be used to place run-off into the soil to treat such problematic substances. It has been found that the soil and the organisms in the soil will break down or even attack many otherwise problematic substances and thus render them substantially inert or eliminate them. Thus, by directing run-off into the soil with a system according to the invention, it can essentially be cleaned. Once treated, it can be cycled to outflow and then directed to a desired location, for example, ground water, without the potential of pollution by the originally problematic substances. It is particularly noted that because it is usually the first run-off that contains most of the problematic substances, the invention would charge the infiltration gallery with the run-off most in need of treatment. Even if additional run-off caused the gallery to reach capacity, overflow would contain less problematic substances.

Still further, it should be appreciated that the invention can be used with a variety of water sources. While the preferred embodiment is discussed in the context of surface water run-off, other sources are possible. For example, a line source, such as water running in a storm gutter, could be tapped. Another example is taking water from a reservoir, which is upstream, and directing it to a location downstream where an infiltration gallery according to the invention could be set up. This is especially attractive in more arid regions. The creation of reservoirs tends to deprive downstream areas of water. It could be advantageous to move some reservoir water (by underground or over-ground pipes) downstream and into a system such as FIG. 1 where water charges the soil.

Thus, the present invention achieves at least all of its stated objectives. Run off, stored water or even river water can also be injected into an infiltration gallery attached to a siphon or valve capable of cycling water head in the infiltration gallery. This design is low-cost and is self-cleaning. The operational objective of this design is to maximize long term water recharge efficiency in an infiltration gallery while minimizing long term maintenance requirements. The siphon behaves as a standard siphon and cycles (drains) as the water level exceeds the critical head in the siphon. After the drainage cycle, the siphon breaks and the siphon reservoir refills. The siphon reservoir consists of the drainage pipe, the large air-filled pores in the gravel backfill, and the air-filled pore space in the surrounding soil. As the siphon refills, water infiltrates into and is redistributed by the soil.

When the siphon cycles, water velocity in the drainage pipe increases, silt in the overlying gravel is back flushed, and water in the drainage pipe reaches entrainment velocity for silt and clay deposited during the infiltration phase of the cycle. This process is analogous to well development. Thus, a siphon can take a linear input of water, sediment, and potential energy and turn it into a nonlinear system that retains a large fraction of the water and potential energy while discharging the sediment and part of the water.

Vegetation over the infiltration galleries can be used to improve infiltration rates of this system. Plant root systems often increase soil saturated hydraulic conductivities one or two orders of magnitude. Reduced carbon released by roots results in soil aggregation. Soil aggregation processes maintain high infiltration rates in grasslands and can be used to combat the natural tendency of pressurized particulate-containing water to plug infiltration systems. In addition, maintenance activities are effectively redefined as farming activities and a profit can be turned off the unavoidable maintenance and evapotranspiration.

Regardless of the initially high permeability of alluvial fan material, the ultimate limitation in design performance will probably be reduced permeability of the system due to silt and clay accumulation (playa end member). A system that self-flushes both salt and sediment and has a designed-in silt aggregation technology is a good candidate for a low cost and low maintainence artificial recharge system.

What is claimed:

1. A passive system for recharging a vadose zone from a source of water comprising:

a valving component;

a leaky or permeable water reservoir in the vadose zone of the ground;

a source of inflow fluidly connected to the leaky or permeable reservoir;

the valving component operatively connected to the leaky or permeable water reservoir;

so that the source of inflow will automatically cycle between modes comprising a first mode which will fill the leaky or permeable water reservoir and infiltrate and recharge at least parts of the surrounding vadose zone as long as infiltration exceeds inflow, but when the reservoir is filled to a level above a critical head, a second mode wherein the valving component will direct water from the reservoir for as long as outflow exceeds inflow plus infiltration.

2. The apparatus of claim 1 where the system is self-cleaning by cycling between inflow and outflow to facilitate purging of sediment.

3. The apparatus of claim 1 wherein the valving component is positioned downstream from the reservoir.

4. The apparatus of claim 1 wherein the valving component is a siphon allowing outflow when a critical head is exceeded.

5. The apparatus of claim 1 wherein the valving component comprises a value element moveable between a closed position blocking outflow and an open position allowing outflow, and further comprising a biasing member urging the valve element to the closed position until a critical head in the reservoir is exceeded.

6. The system of claim 1 wherein the reservoir comprises a porous volume in the ground.

7. The system of claim 6 wherein the porous volume comprises a trench filled with porous material.

8. The system of claim 7 wherein the porous material is crushed rock or gravel.

9. The system of claim 1 wherein the siphon comprises a pipe having a first end in fluid communication with the reservoir, a second end in fluid communication with an outlet, and an intermediate section comprising an inverted u-shape, the top of the inverted u-shape being positionable in the vadose zone at the level of the critical head of the siphon.

10. The system of claim 1 further comprising a drainage pipe connected between the source of inflow and the siphon and extending through or near the reservoir.

11. The system of claim 10 wherein the drainage pipe has a slope downward in the direction of the siphon.

12. The system of claim 10 wherein the drainage pipe is permeable to water.

13. The system of claim 12 wherein the drainage pipe is perforated.

14. The system of claim 1 further comprising wherein reservoir size, siphon size and flow rates are designed to entrain sediments during siphoning.

15. An apparatus to assist in beneficial use of storm water or surface run-off comprising:

a conduit from a source of inflow water from storm water or surface runoff to a permeable water reservoir in the ground, the permeable water reservoir comprising a permeable volume in the ground;

a siphon having a critical head, the siphon positioned downstream of the reservoir and connected to an overflow discharge;

wherein the siphon automatically cycles and drains to the discharge when the water level in the reservoir exceeds the critical head in the siphon.

16. The apparatus of claim 15 wherein the permeable volume comprises a trench filled with rocks or gravel.

17. The apparatus of claim 16 wherein the permeable volume further comprises porous soil around the trench.

18. The apparatus of claim 15 wherein the permeable volume includes a drainage pipe having a permeable section.

19. The apparatus of claim 15 wherein the source of inflow comprises a point source of water.

20. The apparatus of claim 19 wherein the point source comprises a storm drain inlet.

21. The apparatus of claim 19 wherein the point source comprises collected water from one of a storm gutter, a reservoir, a river, or a natural water source.

22. The apparatus of claim 15 wherein the source of inflow comprises a line source of water.

23. A system to store and recharge adjacent zones in the ground with water comprising:
   a surface water runoff collector;
   a fluid conduit having a first section in fluid communication with the collector, a second fluid permeable section in fluid communication with the first section, a third inverted section, and a fourth section in fluid communication with an outlet, the third section capable of functioning as a siphon;
   a permeable trench into which the second section of the conduit is placed;
   at least semi-permeable ground surrounding the permeable trench.

24. The system of claim 23 wherein collector comprises an inlet with a opening in fluid communication with said conduit.

25. The system of claim 23 wherein the inlet comprises a drain for surface run-off.

26. The system of claim 23 wherein said permeable section of the conduit comprises a perforated pipe.

27. The system of claim 23 wherein said third section comprises a fluid impermeable inverted P trap.

28. The system of claim 23 wherein the inverted section comprises first and second legs and joined at adjacent ends, and in operation, the joined adjacent ends defining the critical head for the siphon.

29. The system of claim 23 wherein said fourth section comprises a conduit having a distal end defining an outlet.

30. The system of claim 23 wherein the permeable trench includes particulate matter at least partially filling said trench.

31. The system of claim 23 further comprising at least partially porous soil surrounding said trench.

32. An apparatus comprising:
   collection means for collecting surface runoff;
   permeable means positionable under ground and in fluid conjunction with the collection means for allowing collected surface runoff to infiltrate the zone in the ground around the permeable means during infiltration periods and allowing stored water in the zone to be collected and conveyed away from the zone during a siphon outflow period;
   siphon means downstream of and in fluid communication with the permeable means for causing siphon outflow from the zone during a siphon outflow period when the water head in the zone exceeds the control head;
   discharge means in fluid communication with the siphon means for directing siphon outflow to a desired location during a siphon outflow period.

33. A method of utilizing or handling collected water, which includes water and water solutes, comprising:
   directing collected water to a permeable underground infiltration zone;
   partitioning the collected water between infiltration into the soil and outflow by automatically cycling between an infiltration and recharge inflow mode as long as infiltration exceeds inflow, and an outflow mode as long as outflow exceeds inflow plus infiltration.

34. The method of claim 33 wherein the step of directing comprises conducting collected water in a fluid pathway to a permeable trench in the ground.

35. The method of claim 34 further comprising allowing water to infiltrate into and through the permeable underground infiltration zone as long as infiltration exceeds inflow.

36. The method of claim 35 further comprising allowing outflow from the infiltration zone after commencement of directing water to the outflow and for as long as outflow exceeds inflow plus infiltration.

37. The method of claim 36 further comprising cycling between the step of claim 35 and the step of claim 36.

38. The method of claim 37 wherein the step of directing water to the outflow comprises siphoning water upon reaching a pre-selected head, and further comprising allowing a consistent siphoning outflow as long as there is general equilibrium between inflow and outflow.

39. The method of claim 33 wherein the collected water is one of surface run-off or reservoir water.

40. The method of claim 33 further comprising treating the collected water by causing it to infiltrate into soil.

41. The method of claim 33 further comprising treating a first volume of water by infiltrating it into soil and thereafter directing a second volume of water to another location.

42. The method of claim 33 further comprising self cleaning by cycling between infiltration and outflow.

43. A passive system for recharging a vadose zone from a source of water comprising:
   a valving component;
   a leaky or permeable water reservoir in the vadose zone of the ground;
   a source of inflow fluidly connected to the leaky or permeable water reservoir;
   so that the source of inflow will fill the leaky or permeable water reservoir and infiltrate and recharge at least parts of the surrounding vadose zone as long as infiltration exceeds inflow, but when the reservoir is filled to a level above a critical head, the valving component will direct water from the reservoir for as long as outflow exceeds inflow plus infiltration, and infiltration and outflow will occur when there is equilibrium between inflow and outflow and where the system is self-cleaning by cycling between inflow and outflow to facilitate purging of sediment.

44. A passive system for recharging a vadose zone from a source of water comprising:
   a valving component comprising a valve element moveable between a closed position blocking outflow and an open position allowing outflow, and further comprising a biasing member urging the valve element to the closed position until a critical head in the reservoir is exceeded;
   a leaky or permeable water reservoir in the vadose zone of the ground;
   a source of inflow fluidly connected to the leaky or permeable water reservoir;
   so that the source of inflow will fill the leaky or permeable water reservoir and infiltrate and recharge at least parts of the surrounding vadose zone as long as infiltration exceeds inflow, but when the reservoir is filled to a level above a critical head, the valving component will direct water from the reservoir for as long as outflow exceeds inflow plus infiltration, and infiltration and outflow will occur when there is equilibrium between inflow and outflow.

45. A passive system for recharging a vadose zone from a source of water comprising:

a valving component;

a leaky or permeable water reservoir in the vadose zone of the ground;

a source of inflow fluidly connected to the leaky or permeable water reservoir;

a drainage pipe connected between the source of inflow and a siphon and extending through or near the reservoir;

so that the source of inflow will fill the leaky or permeable water reservoir and infiltrate and recharge at least parts of the surrounding vadose zone as long as infiltration exceeds inflow, but when the reservoir is filled to a level above a critical head, the valving component will direct water from the reservoir for as long as outflow exceeds inflow plus infiltration, and infiltration and outflow will occur when there is equilibrium between inflow and outflow.

46. The system of claim 45 wherein the drainage pipe has a slope downward in the direction of the siphon.

47. The system of claim 45 wherein the drainage pipe is permeable to water.

48. The system of claim 45 wherein the drainage pipe is perforated.

49. A passive system for recharging a vadose zone from a source of water comprising:

a valving component;

a leaky or permeable water reservoir in the vadose zone of the ground;

a source of inflow fluidly connected to the leaky or permeable water reservoir;

so that the source of inflow will fill the leaky or permeable water reservoir and infiltrate and recharge at least parts of the surrounding vadose zone as long as infiltration exceeds inflow, but when the reservoir is filled to a level above a critical head, the valving component will direct water from the reservoir for as long as outflow exceeds inflow plus infiltration, and infiltration and outflow will occur when there is equilibrium between inflow and outflow; and reservoir size, siphon size, and flow rates designed to entrain sediments during siphoning.

50. A method of utilizing or handling collected water, which includes water and water solutes, comprising:

(a) directing collected water to a permeable underground infiltration zone, comprising conducting collected water in a fluid pathway to a permeable trench in the ground, (b) partitioning the collected water between infiltration into the soil and outflow comprising;

(b1) allowing water to infiltrate into and through the permeable underground infiltration zone as long as infiltration exceeds inflow;

(b2) allowing outflow from the infiltration zone by commencement of directing water to the outflow by siphoning water upon reaching a preselected head, and for as long as outflow exceeds inflow plus infiltration, directing water to the outflow, including allowing a consistent siphoning outflow as long as there is general equilibrium between inflow and outflow.

(b3) cycling between steps (b1) and (b2).

* * * * *